US011977404B2

(12) United States Patent
Chandrasekaran

(10) Patent No.: US 11,977,404 B2
(45) Date of Patent: May 7, 2024

(54) FAST STARTUP POWER REGULATOR CIRCUITRY

(71) Applicant: TEXAS INSTRUMENTS INCORPORATED, Dallas, TX (US)

(72) Inventor: Ramesh Mosur Chandrasekaran, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 159 days.

(21) Appl. No.: 17/682,591

(22) Filed: Feb. 28, 2022

(65) Prior Publication Data

US 2023/0273633 A1     Aug. 31, 2023

(51) Int. Cl.
*G05F 1/575* (2006.01)
*H02M 3/158* (2006.01)

(52) U.S. Cl.
CPC .......... *G05F 1/575* (2013.01); *H02M 3/1582* (2013.01)

(58) Field of Classification Search
CPC .......... G05F 1/462; G05F 1/465; G05F 1/468; G05F 1/56; G05F 1/575; G05F 1/562; G05F 1/565; G05F 1/567; G05F 1/569; G05F 1/571; G05F 1/573; G05F 1/5735; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/463; G05F 1/46; G05F 1/461; G05F 1/00; G05F 1/10; G05F 1/12; G05F 1/455; G05F 1/45; G05F 1/445; G05F 1/66; G05F 1/40; G05F 1/42; G05F 1/44; G05F 1/52; H02M 3/22; H02M 1/08; H02M 1/36; H02M 3/24; H02M 3/325; H02M 3/335; H02M 3/28; H02M 3/33569; H02M 3/33507; H02M 2007/4815; H02M 2007/4818;
(Continued)

(56) References Cited

U.S. PATENT DOCUMENTS 5,025,226 A * 6/1991 Taylor ................... H03F 3/3455
330/296
6,380,799 B1 * 4/2002 Chung ................... G11C 5/147
327/543

(Continued)

*Primary Examiner* — Thienvu V Tran
*Assistant Examiner* — Nusrat Quddus
(74) *Attorney, Agent, or Firm* — Charles F. Koch; Frank D. Cimino

(57) ABSTRACT

An example circuit includes a first source follower input stage having a reference voltage input and a first output. A second source follower input stage has a feedback voltage input and a second output, in which second source follower input stage is configured to receive a feedback voltage at the feedback voltage input. The feedback voltage is representative of an output voltage at an output terminal of the circuit. A common gate differential gain stage has first and second differential inputs and first and second drive outputs. The first differential input is coupled to the first output, and the second differential input is coupled to the second output. The common gate differential gain stage is configured to control the output voltage at the output terminal by controlling at least one of the first or second drive outputs.

20 Claims, 8 Drawing Sheets

(58) Field of Classification Search
CPC ............. H02M 1/083; H02M 3/33538; H02M 3/33546; H02M 3/33515; H02M 3/33576; H02M 3/33592; H02M 3/33553; H02M 3/33523; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 2003/071; H02M 2003/072; H02M 3/073; H02M 2003/075; H02M 2003/076; H02M 2003/077; H02M 2003/078; H02M 2001/0048; Y02B 70/1491; H05B 39/048; B23K 11/24; H04B 2215/069; H02J 3/46; H02J 3/38

See application file for complete search history.

(56) References Cited

U.S. PATENT DOCUMENTS

| | | | | |
|---|---|---|---|---|
| 7,276,953 | B1* | 10/2007 | Peng | H03K 19/018528 327/333 |
| 7,893,768 | B2* | 2/2011 | Wang | H03F 3/45475 330/279 |
| 10,224,812 | B1* | 3/2019 | Sen | H02M 3/157 |
| 2002/0084840 | A1* | 7/2002 | Tsuchi | H03F 3/505 327/563 |
| 2004/0145361 | A1* | 7/2004 | Owen | G05F 3/262 323/313 |
| 2005/0104003 | A1* | 5/2005 | Jarron | H03F 3/087 348/E3.018 |
| 2005/0264356 | A1* | 12/2005 | Kucharski | H03F 3/45085 330/252 |
| 2009/0058527 | A1* | 3/2009 | Srinivasa | H03F 3/4565 341/155 |
| 2009/0102552 | A1* | 4/2009 | Shiramizu | H03G 1/0023 330/98 |
| 2013/0271095 | A1* | 10/2013 | Jackum | G05F 1/56 323/270 |
| 2013/0285715 | A1* | 10/2013 | Wu | H03D 7/1441 327/113 |
| 2014/0077878 | A1* | 3/2014 | Hsieh | H03F 3/45 330/254 |
| 2015/0061767 | A1* | 3/2015 | Francis | H03F 3/45183 330/258 |
| 2022/0208374 | A1* | 6/2022 | Neumann | G16H 50/20 |
| 2023/0208374 | A1* | 6/2023 | Cascio | H03F 1/0222 330/252 |

* cited by examiner

US 11,977,404 B2

FAST STARTUP POWER REGULATOR CIRCUITRY

TECHNICAL FIELD

This description relates to power regulator circuitry.

BACKGROUND

Power regulators are used in variety of applications to supply electrical power to a load. As an example, some power supplies use power regulators, such as switching regulators, to convert electrical power from one form to another and provide a regulated voltage at an output terminal. The power regulator is configured to maintain the regulated output voltage over a range of operating conditions, including at startup as well as under changing load conditions. In applications in which a fast transient response is desired, the design and operation of power regulator circuits can become complicated.

SUMMARY

In a described example, a circuit includes a first source follower input stage having a reference voltage input and a first output. A second source follower input stage has a feedback voltage input and a second output, in which second source follower input stage is configured to receive a feedback voltage at the feedback voltage input. The feedback voltage is representative of an output voltage at an output terminal of the circuit. A common gate differential gain stage has first and second differential inputs and first and second drive outputs. The first differential input is coupled to the first output, and the second differential input is coupled to the second output. The common gate differential gain stage is configured to control the output voltage at the output terminal by controlling at least one of the first or second drive outputs.

In another described example, a system includes a power regulator circuit, an output power transistor, a reference circuit having a reference output coupled to the reference input, and a driver circuit. The power regulator circuit includes a first source follower input stage having a reference input and a first output, and a second source follower input stage having a feedback input and a second output. The power regulator circuit also includes a common gate differential gain stage having first and second drive inputs, a bias input and a control output. The first drive input is coupled to the first output, and the second drive input is coupled to the second output. The output power transistor has a control input, a voltage input and a regulator output, in which the control input is coupled to the control output. The reference circuit has a reference output coupled to the reference input. The driver circuit has a driver input coupled to the regulator output.

As a further described example, a circuit includes a first source follower input stage configured to provide a first drive signal responsive to a reference voltage. A second source follower input stage is configured to provide a second drive signal responsive to a feedback voltage, which is representative of an output voltage at an output terminal of the circuit. A common gate differential gain stage has respective parallel gain stages, in which the respective parallel gain stages are configured to control a current through the respective parallel gain stages responsive to the first and second drive signals. The common gate differential gain stage is configured to provide a control signal responsive to the current through the respective parallel gain stages. An output power transistor is configured to provide the output voltage at the output terminal responsive to the control signal and an input voltage.

BRIEF DESCRIPTION OF THE DRAWINGS

FIGS. 5A and 5B FIG. 5 depicts depict part of the power regulator circuit of FIGS. 2A and 2B showing operation thereof in connection with a load insertion event.

DETAILED DESCRIPTION

Figure 1:
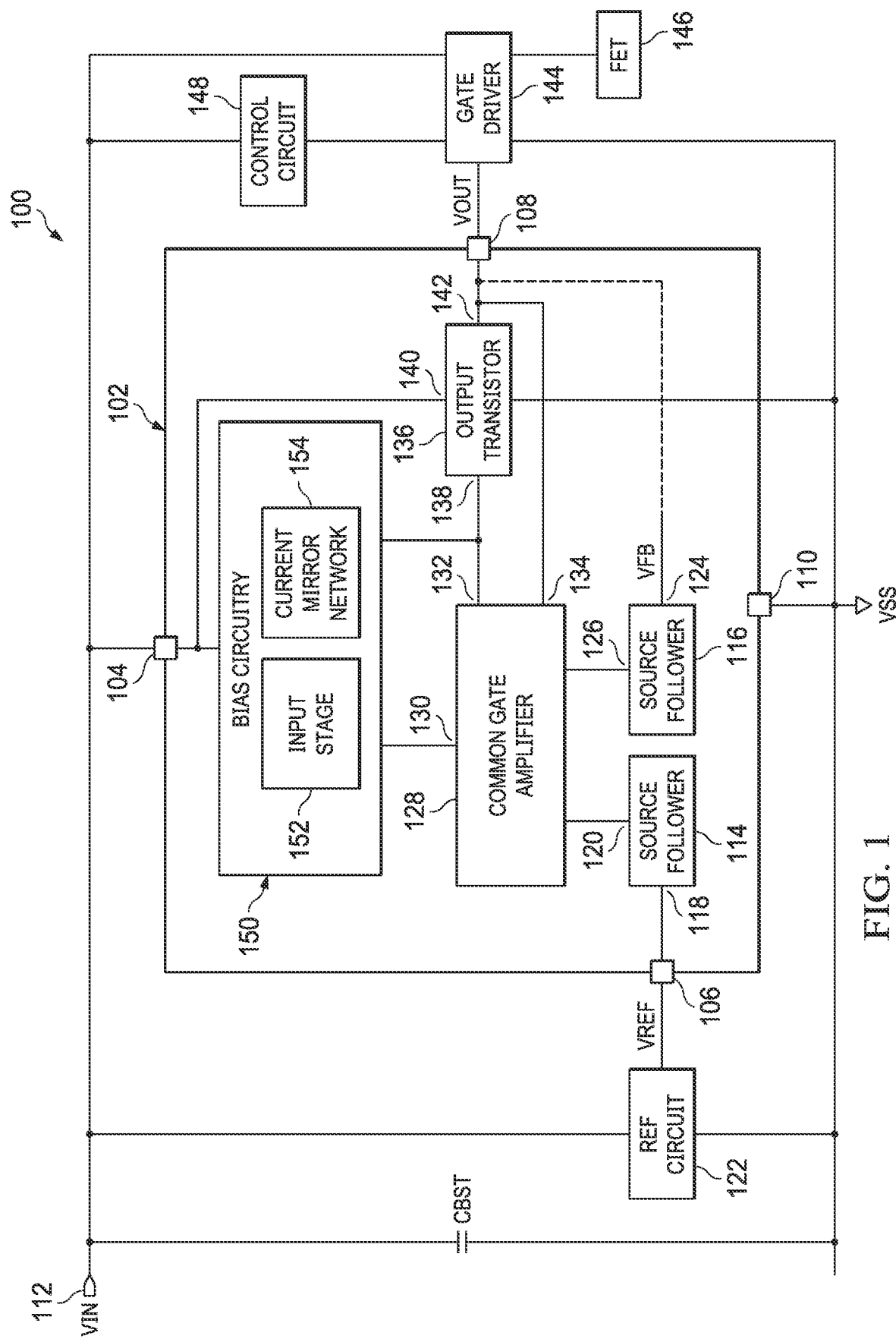
FIG. 1 is a block diagram of an example power supply system that includes a power regulator circuit.

Example embodiments relate to power regulator circuits and systems implementing power regulator circuits.

For example, a regulator circuit is configured to provide a regulated output voltage at an output terminal. The regulator circuit includes a first source follower input stage configured to provide a first drive signal responsive to a reference voltage. The reference voltage can be provided by a bandgap circuit, and can increase from a starting voltage to a desired bandgap voltage at startup (e.g., power up) of the circuit. The startup event can occur responsive to a power supply being activated or otherwise coupled to the system. A second source follower input stage is configured to provide a second drive signal responsive to a feedback voltage, which is representative of the output voltage. A common gate differential amplifier has respective parallel stages coupled to the first and second source follower input stages. The respective parallel stages are configured to control bias current responsive to the first and second drive signals. The common gate differential amplifier also is configured to provide a control signal responsive to the current through each of the respective parallel stages. The regulator circuit also includes an output transistor (e.g., field effect transistor (FET)) configured to provide a regulated output voltage at the output terminal responsive to the control signal.

As described herein, the use of a source follower input stage to drive the common gate differential amplifier for regulator enables a fast startup time for the regulator circuit. For example, during a startup event, the regulator circuit follows the reference voltage, and no additional time is needed for the regulator to startup. Also, during the startup event, the regulator circuit limits the output voltage responsive to the reference voltage to reduce (or avoid) overshoot transients at the output terminal. The regulator circuit also implements an architecture that achieves a fast transient response for a given quiescent current. In contrast, many existing regulator input stages implement a common source configuration, which supply bias currents after the reference voltage reaches a threshold voltage. Thus, in such existing designs, more time is needed for the bias currents to charge node capacitances to operating point stage. The circuits described herein enable startup to occur simultaneously with the reference voltage.

In one example, the regulator circuit is implemented in a driver circuit that is coupled to one or more power switch devices (e.g., GaN or other power devices that can operate in the MHz range or faster). As the sizes of power supply solutions shrink and conversion efficiencies increase with the availability of GaN and other power devices that can operate in MHz range or faster, gate drivers that can drive the power devices at these frequencies are desirable. The circuits described herein can be implemented to meet existing needs by enabling fast operation with reduced transients compared to many existing approaches.

FIG. 1 is a block diagram of an example system 100 that includes a power regulator circuit 102 (also referred to herein as a regulator circuit or regulator). The regulator circuit 102 can be configured as any type of regulator, such as including a buck regulator, a boost regulator, a buck-boost regulator or other regulator depending on application requirements. As an example, the regulator 102 is a linear regulator. The regulator circuit 102 further can be implemented as a linear regulator within an integrated circuit (IC), such as a subcircuit, to supply a regulated input voltage to another power supply, such as another regulator (e.g., a switching or other regulator circuit), which can supply electrical power to any of a variety of electronic devices or systems.

As used herein, the term "circuit" can include a collection of active and/or passive elements that perform a circuit function, such as an analog circuit or control circuit. Additionally or alternatively, for example, the term "circuit" can include an integrated circuit (IC) where all and/or some of the circuit elements are fabricated on a common substrate (e.g., semiconductor substrate, such as a die or chip). In an example, the regulator circuit 102 is implemented in an integrated circuit (IC) chip or as part of a system on chip (SoC). For example, the system 100, the regulator circuit 102 or any of its constituent parts may be coupled to a printed circuit board.

In the example of FIG. 1, the regulator circuit 102 has an input voltage input 104, a reference input 106, an output terminal 108 and ground terminal 110. The input voltage input 104 is coupled to a system voltage input terminal 112, which is adapted to be coupled to a power supply. For example, the power supply is a battery or rectifier circuitry configured to provide a DC input voltage VIN at the input terminal 112. The ground terminal 110 is coupled to a system ground, such as a voltage source supply (VSS) for the system 100. A capacitor CBST can be coupled between the input terminal 112 and the ground terminal 110. The capacitor CBST is configured to store charge for providing a voltage to the input terminal 112. Also, the capacitor CBST can be used as a bootstrap source without connecting input terminal 112 to a power supply continuously.

The regulator circuit 102 includes first and second source follower input stages 114 and 116. The first source follower input stage 114 has a reference voltage input 118 and a first output 120. The reference voltage input 118 is coupled to a reference circuit 122 through the reference input 106. The reference circuit 122 is configured to provide a reference voltage VREF to the reference input 106. In an example, the reference circuit 122 is implemented as a bandgap circuit configured to provide a bandgap reference voltage to the reference voltage input 118. The first source follower input stage 114 is configured to provide a first drive signal at its output 120 responsive to the reference voltage VREF.

The second source follower input stage 116 has a feedback voltage input 124 and an output 126. The feedback voltage input 124 is configured to receive a feedback voltage VFB representative of an output voltage VOUT at the output terminal 108 (shown as a dotted line). In an example, feedback voltage input 124 is coupled to circuitry (e.g., a voltage divider) configured to provide a measure of the output voltage or it can be coupled to output terminal 108. The second source follower input stage 116 is configured to provide a second drive signal at output 126 responsive to the feedback voltage VFB.

The regulator circuit 102 also includes a common gate differential gain stage (also referred to herein as a common gate amplifier or common gate differential amplifier) 128. In the example of FIG. 1, the common gate differential amplifier 128 has first and second differential inputs coupled to respective outputs 120 and 126. The common gate differential amplifier 128 also has a common bias terminal (e.g., an input node) 130, as well as first and second drive outputs 132 and 134. Drive output 134 is coupled to the output terminal 108.

The power regulator 102 also includes an output transistor 136 having a control input 138, a voltage input 140 and an output 142. The control input 138 is coupled to the drive output 132, and the voltage input is coupled to the input 104, which is coupled to input terminal 112. The output 142 of the power switch 136 is coupled to the output terminal 108. For example, the transistor 136 is implemented as metal oxide semiconductor field effect transistors (MOSFETs or FETs). In other examples, the transistor 136 can be implemented as other types of transistors, such as insulated-gate bipolar transistors (IGBTs), bipolar junction transistors (BJTs), laterally-diffused metal-oxide semiconductor (LDMOS) transistors, and the like. The output transistor 136 is configured to provide the output voltage VOUT (a regulated voltage) at the output terminal 108 responsive to the drive outputs provided at 132 and 134 as well as the input voltage VIN. The output terminal 108 is adapted to be coupled to a gate driver 144. For example, the gate driver 144 has a voltage input coupled to the output terminal 108 to receive the regulated output voltage VOUT.

Figure 2A:
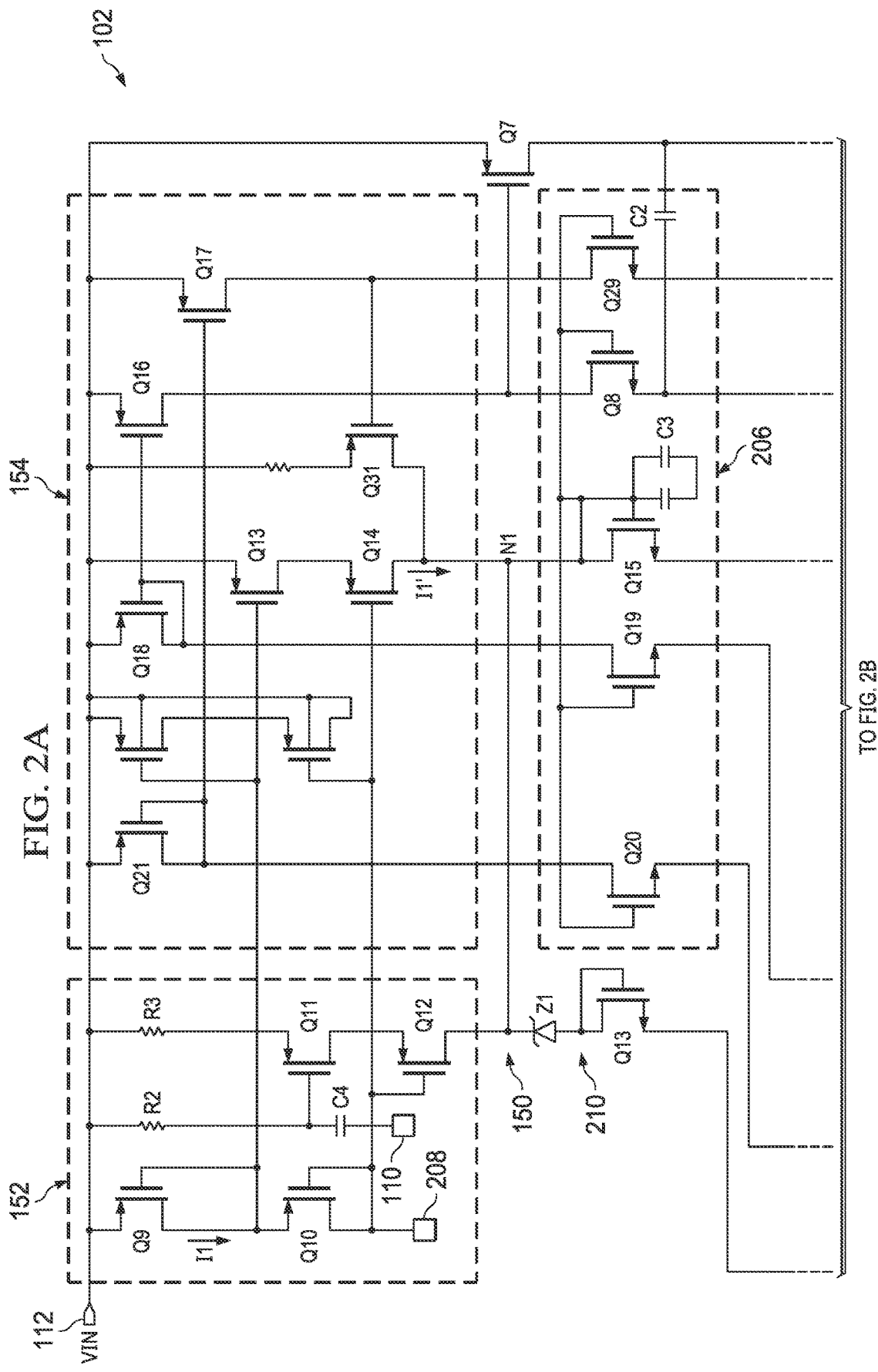
FIGS. 2A and 2B depicts an example the power regulator circuit of FIG. 1.

The power regulator 102 also includes bias and load circuitry 150. The circuitry 150 is coupled to the voltage input 104 and to the common bias terminal 130 of the common gate amplifier 128 to provide bias. The circuitry 150 is configured to supply bias currents for operating the power regulator 102 responsive to the input voltage VIN at 112 and reference current provided at 208 (FIG. 2A). The bias currents that are generated (e.g., by circuitry 150) can be used to charge node capacitances to normal operating levels during operation and enable voltage regulation by the various components of the power regulator circuit 102. While the bias and load circuitry 150 is shown as being separate from the amplifier circuit 128, one or more circuit components can be considered as part of one block or another according to the placement or function of such components in the regulator circuit 102. Accordingly, the exact delineation among blocks and their respective components to provide the circuit 102 can vary from that shown in the figures.

In the example of FIG. 1, the circuitry 150 includes an input stage 152 and a current mirror network 154. The input stage 152 is configured to supply input current to the regulator circuit 102 responsive to VIN and the voltage across CBST. The current mirror network 154 includes an arrangement of transistors configured to mirror currents through the regulator circuit 102 for biasing respective nodes through input signals at 130 for driving an output transistor (e.g., a FET) Q7 responsive to the amplifier inputs. The output transistor Q7 is coupled between the output terminal 108 and the input terminal 112.

As described herein, during startup, including at times before VIN has ramped up sufficiently the source follower input stages 114 and 116 and common gate amplifier 128 can leverage the reference voltage as it ramps up to the desired reference voltage so the regulator circuit can operate more quickly to provide the regulated output voltage VOUT at 108. This is because unlike regulators that implement a typical common source input stage configuration, the regulator circuit 102 described herein does not limit currents at start up.

As a further example, regulators that implement the common source configuration usually need additional time for startup and the regulator to stabilize because the common source input stage requires the reference voltage to exceed a threshold voltage before it can enable bias currents to flow. Thus, the power regulator circuit 102 described herein can achieve a faster response at startup (e.g., dependent on the time for VREF to increase and settle to a desired voltage, such as a bandgap reference). Also, because the power regulator circuit 102 is configured to provide the regulated output voltage VOUT responsive to the reference voltage during the startup event, voltage overshoot at 108 is reduced. For example, the output voltage VOUT rises with the input reference voltage REF and thus limits overshoot. The power regulator circuit 102 can also include output limiting circuitry to further reduce transients (e.g., undershoot and/or overshoot) at the output terminal 108 responsive to load removal and insertion events. The common gate configuration further enables reduced quiescent current consumption for the required transient load requirements.

The power regulator circuit 102 can be used to supply the regulated output voltage VOUT to any system in need of a fast start regulator. As shown in FIG. 1, the gate driver 144 is coupled to one or more FETs 146. A control circuit is coupled to the gate driver 144. The control circuit 148 is configured to control the gate driver 144 for providing a gate drive signal to control operation of the one or more FETs. In an example, the one or more FETs 146 is a GaN FET, such as can be used in power conversion applications to implement a half bridge or other power converter topology. In other examples, other types of transistors can be used. Also, in the example of FIG. 1, the system 100 includes one instance of the power regulator configured to provide a regulated output voltage to the gate driver 144. In other examples, the system 100 includes a number of instances, in which each instance of the power regulator 102 is configured to supply regulated voltage to a respective gate driver or other circuitry.

Figure 2B:
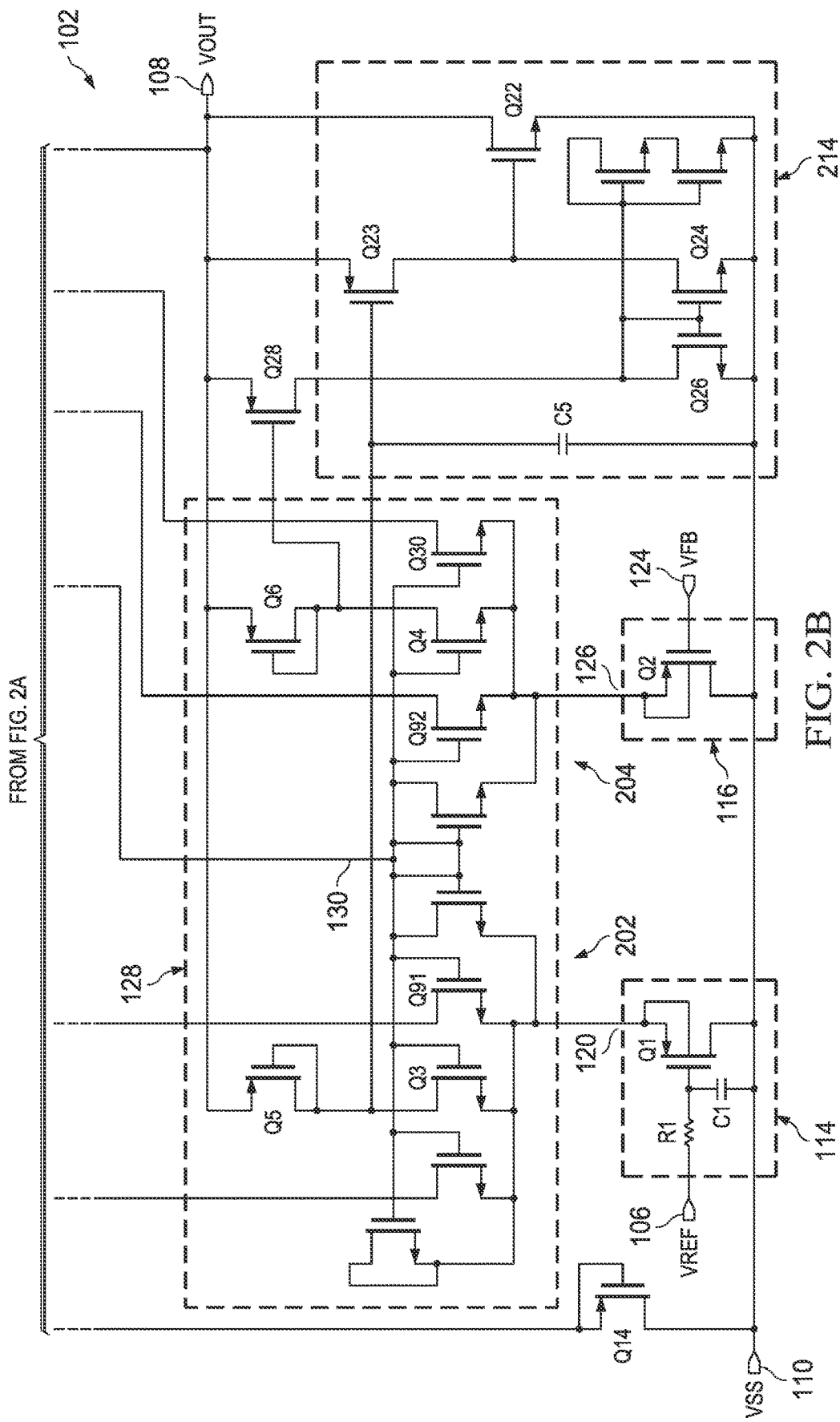

FIGS. 2A and 2B depicts an example of a power regulator circuit 102. The regulator circuit 102 can be used to implement the regulator circuit in FIG. 1. Accordingly, the description of FIGS. 2A and 2B also refers to FIG. 1. The regulator circuit 102 thus includes an input terminal 112, an output terminal 108 and a ground terminal 110. The regulator circuit 102 also includes source follower input stages 114 and 116 and a common gate differential amplifier 128.

For example, the input stages 114 and 116 include respective transistors, shown as p-channel metal-oxide-semiconductor field effect transistors Q1 and Q2. The gate of Q1 is coupled to reference input 106, which is configured to receive VREF. For example, the reference input 106 is adapted to be coupled to a bandgap circuit (e.g., circuit 122) configured to provide VREF. The drain of Q1 is coupled to the ground terminal, and the source of Q1 is coupled to an input of the common gate differential amplifier 128. In the example of FIG. 2B, the input stage 114 includes a filter (e.g., a resistor-capacitor) circuit having a resistor R1 and a capacitor C1. The filter circuit can be implemented as a low pass filter having a time constant configured to pass low frequency content provided at the reference input 106 (e.g., by reference circuit 122) so the DC components of the voltage VREF provided at 106 are passed to the gate of Q1.

The gate of Q2 is configured to receive a feedback voltage VFB, which is representative of an output voltage VOUT provided at the output terminal 108. In one example, a circuit (e.g., including a voltage divider) is coupled between the gate of Q2 and the output terminal) and is configured to provide the feedback voltage VFB responsive to the output voltage VOUT at 108. In another example, the gate of Q2 is coupled directly to the output terminal 108.

The common gate differential amplifier 128 includes an arrangement of FETs configured in a common gate differential amplifier topology. The common gate differential amplifier 128 has amplifier inputs coupled to outputs 120 and 126 of the respective source follower circuits 114 and 116. In the example of FIG. 2B, the common gate differential amplifier 128 includes a reference portion 202 and a feedback portion 204. The FETs of the reference portion 202 have respective sources coupled to the output 120 of source follower circuit 114. The FETs of the reference portion 204 have respective sources coupled to the output 126 of source follower circuit 116. Thus, Q1 is configured to drive part of the common gate amplifier 128 responsive to VREF, and Q2 is configured to drive another part of the common gate amplifier 128 responsive to VFB.

In the common gate configuration, the gates of the FETs for the reference and feedback portions 202 and 204 are coupled together (e.g., a common gate) at the common bias terminal 130, which is coupled to the circuitry 150. The FETs of the reference portion 202 are controlled responsive to the gate-to-source voltage (e.g., the voltage potential between 130 and 120). Similarly, The FETs of the feedback portion 204 are controlled responsive to the gate-to-source voltage (e.g., the voltage potential between 130 and 126). A FET Q91 of the reference portion has its drain coupled to the output terminal through a diode-connected FET Q18. A FET Q92 of the feedback portion likewise has its drain coupled to the output terminal through another diode-connected FET Q16. As a result, the respective reference and feedback portions 202 and 204 are configured to control the output voltage VOUT at 108 by controlling the gate voltage of Q7 generated by Q92 and Q16 depending on a difference between VREF and VFB.

The regulator circuit 102 also includes a cascode network 206. The cascode network 206 includes an arrangement of cascode transistors Q29, Q8, Q15, Q19 and Q20. For example, the transistors Q29, Q8, Q15, Q19 and Q20 are implemented as FETs having a common gate terminal coupled to a capacitor network, shown as C3. Capacitor network C3 is configured to hold the gate bias voltage static. The cascode network 206 also includes a compensation capacitor C2 coupled between the output terminal 108 and the source of Q8. The common bias terminal 130 is connected to a main bias leg of the regulator circuit 102, in which transistor Q15 generates the bias voltage for all the respective transistors Q20, Q19, Q8 and Q29. The cascode transistors Q29, Q8, Q15, Q19 and Q20 are configured (e.g., sized) to enable supporting higher voltage (e.g., tens of volts) between VIN and VSS, whereas other transistors (e.g., in circuitry 150, amplifier 128, etc.) can be implemented as lower voltage transistors configured provide better performance.

The circuitry 150 includes an input stage 152 configured to inject current to the power regulator based on the input voltage VIN at 112. The input stage 152 includes FETs Q9 and Q10 coupled between input terminal 112 and a current input terminal 208. For example, terminal 208 is coupled to reference circuit 122 (shown in FIG. 1), which is configured to generate a reference bias current I1 through Q9 and Q10. The reference current is mirrored by transistors Q13 and Q14 to provide the bias current to the amplifier 128 through the common bias terminal 130. RC filter network includes resistor R2 and capacitor C4 coupled between 112 and 110. The terminal between R2 and C4 is coupled to the gate of another FET Q11 (a PFET). The source of Q11 is coupled to the input terminal 112 through a resistor R3. The drain of Q11 is coupled to the source of FET Q12, which has its gate coupled to 208 and drain coupled to a main bias node N1.

In some examples, such as when the bootstrap voltage provided at the input terminal 112 is low, the regulator may or may not be in regulation, and the reference circuit that provides VREF can be turned on. During normal operation, the input stage 152 is configured to charge capacitor C4 to VIN, which keeps FET Q11 turned off. However, when VIN ramps up, such as during a wake up event, the capacitor C4 is slow to follow the increase in VIN (e.g., due to the time constant o the RC circuit of R1 and C4), which results in turning on Q11 and Q12. Responsive to Q11 and Q12 being turned on, additional current flows through R3, Q11 and Q12 to increase the bias current to N1, which provides for a faster recovery during a wake up event.

A cascode clamp circuit 210 is coupled to N1, and is configured to limit the voltage at N1, including during the wake up event described above. In the example of FIGS. 2A and 2B, the clamp circuit 210 includes a Zener diode Z1 in series with diode-connected transistors Q13 and Q14 between N1 and terminal 110 (e.g., VSS). N1 is also coupled to bias the common bias terminal 130 of the common gate amplifier through FET Q15. For example, Q15 has its gate and drain coupled to the capacitor network C3 and N1 so Q15 is diode-connected and thus configured to couple N1 to the common bias terminal 130 of the common gate amplifier during normal operation.

Also, the current mirror network circuitry includes FETs Q16 and Q17. Q16 has its gate coupled to the gate of Q18, which is diode-connected in series with another FET Q19. The drain of Q16 is coupled to the gate of the output FET Q7. The gate of Q17 is coupled to the gate and drain of diode-connected FET Q21. Similar to Q18, the drain of Q21 is coupled to the drain of another FET Q20. The sources of Q19 and Q20 are coupled to drains of respective FETs of the common gate amplifier 128. The drain of Q17 is coupled to the drain of Q29 of the cascode network 206, and the source of Q29 is coupled to the drain of Q30. The drain of Q17 is also coupled to the gate of Q31, the source of Q31 is coupled to the input terminal 112 through a resistor, and the drain of Q31 is coupled to the drain of Q14. In an example, Q17 is stronger than Q30 so during normal operation, Q31 is turned off.

In another example, the regulator circuit 102 also includes an output limiter circuit 214 coupled between the output terminal 108 and the ground terminal 110. The output limiter circuit 214 includes a FET Q22 coupled between the output terminal 108 and the ground terminal 110. The gate of Q22 is coupled to respective drains of FETs Q23 and Q24, which are also coupled between the output and ground terminals 108 and 110, respectively. The gate of FET Q24 is coupled to the gate and drain of diode-connected FET Q26. The gate of Q23 is coupled to the gate and drain of diode-connected FET Q5. The drain of Q26 is also coupled to the drain of FET Q28, which has its source coupled to the output terminal 108. The gate of Q28 is coupled to the drain of diode-connected FET Q6 (also coupled to drain of Q4). As described herein, the output limiter circuit 214 is configured to limit voltage overshoot at the output terminal 108, such as when a load is removed from the output terminal.

Figure 3:
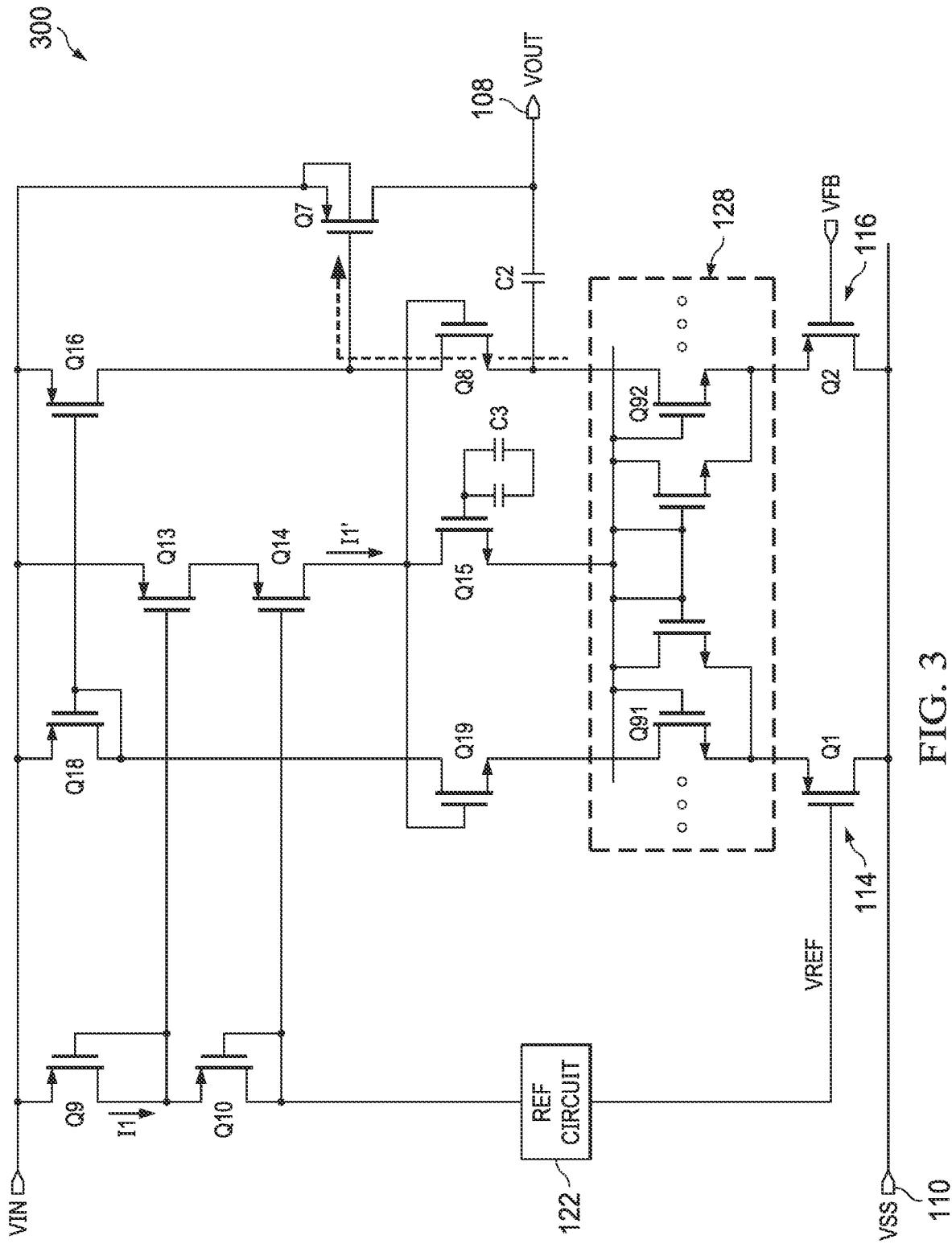
FIG. 3 depicts part of the power regulator circuit of FIGS. 2A and 2B showing operation thereof in connection with a startup event.
Figure 4:
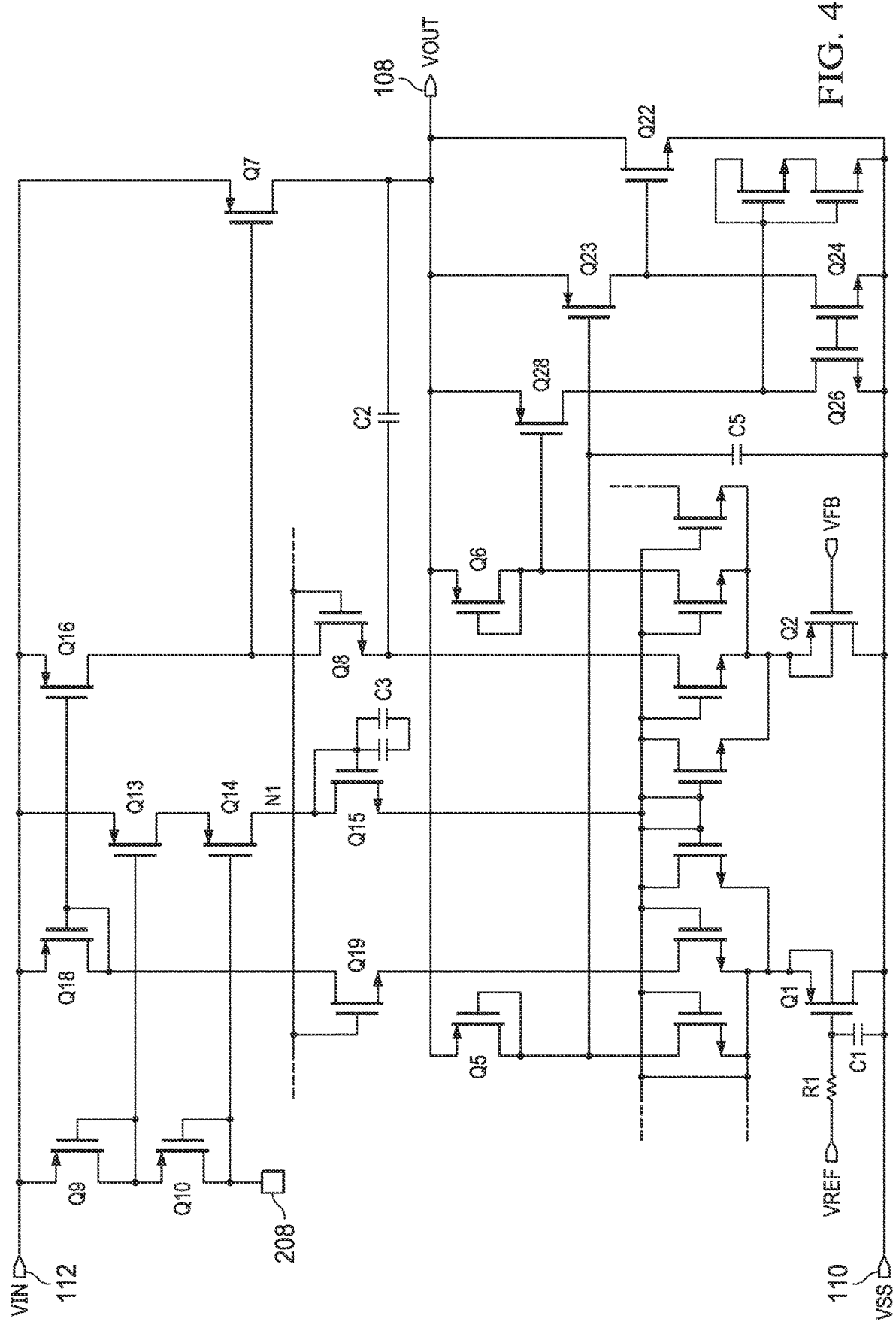
FIG. 4 depicts part of the power regulator circuit of FIGS. 2A and 2B showing operation thereof in connection with a load removal event.

FIGS. 3, 4 and 5 show parts of the regulator circuit 102 configured to implement respective circuit functions during different operating conditions for the circuit. Accordingly, the description of FIGS. 3, 4 and 5 also refers to FIGS. 2A and 2B.

The example of FIG. 3 shows relevant regulator circuitry 300 configured for normal operation including during a startup event (e.g., at initial power up) of regulator circuit 102. During startup, the regulator circuitry 300 is configured to begin regulation to provide a regulated output at 108 responsive to the reference voltage VREF at 106. For example, a reference circuit (e.g., circuit 122) is configured to increase the reference voltage VREF from a starting voltage (e.g., 0 V or another low voltage below the desired reference voltage). Reference circuit 122 also provides the reference startup current through Q9 and Q10, shown as I1. Q13 and Q14 mirror this current as proportional current IF, which is suppled through FET Q15 to the bias node 130 and to respective gates of the common gate amplifier 128. Respective current can thus flow through Q1 and Q2 (e.g., PFET transistors) because their gate voltages are low at startup. Accordingly, the respective currents can bring up the amplifier 130 along with the reference circuit 122 bringing up VREF during startup. The circuitry 300 is configured to increase the regulated output voltage VOUT at 108 responsive to VREF, and when the input voltage VIN reaches a threshold input voltage (e.g., a bootstrap voltage threshold), the startup event ends.

Initially, at startup, VFB=0 and as VREF comes up, the common gate differential amplifier 128 is configured to conduct current in the regulator circuitry 300 for fast charging of the charge storage devices (e.g., capacitors). Also, voltage overshoot is reduced at 108 because VOUT comes up in sync with VREF (e.g., supplied by reference circuit 122) through operation of the common gate amplifier 128 and the source follower input stages 114 and 116. After the reference voltage VREF is up to its set level, the startup event implemented by the regulator circuitry 300 terminates.

The circuitry shown in FIG. 3 is the primary regulation configuration for normal operation. The amplifier formed by Q91, Q92, Q18 and Q16, as shown in FIG. 3, is configured to regulate VOUT at 108 by controlling the gate of Q7. If VOUT is lower than expected (e.g., if VFB is lower than VREF), the amplifier of Q91, Q92, Q18 and Q16 is configured to pull down on the gate of Q7 to restore VOUT.

FIG. 4 shows an example relevant circuitry 400 of regulator circuit 102 configured to limit overshoot during a load removal event, such as responsive to a release of a load coupled to the output terminal 108. The load removal event can provide a short duration transient event or a sustained transient event. For example, Q24 is stronger than Q23 so in normal operation Q24 is configured to keep Q22 off. Capacitor C5 is configured to store charge sufficient to hold the gate of Q23. As an example, as VOUT increases responsive to a short duration transient load removal event, Q23 pulls on the gate of Q22 so Q22 is activated to pull current from the output terminal 108 and thus limit overshoot during the short duration transient event.

In the example a load removal event that results in sustained current into the output terminal 108, current continues to flow to the output terminal 108 and increase VOUT further responsive to the load removal event. The increase in VOUT causes VFB to increase to a level greater than VREF. Responsive to VFB>VREF, the current through Q6 (e.g., of the feedback portion 204) decreases, which results in a proportional decrease in current through Q26. Responsive to VFB>VREF, the current through Q5 (e.g., and the reference portion 202) increases, which causes the capacitor C5 to discharge and makes Q23 more conductive, and causes Q22 to sink current into (e.g., pull current from) the output terminal 108. As the output voltage decreases, the regulator circuit 102 will regulate the output responsive to VREF during normal operation.

Figure 5A:
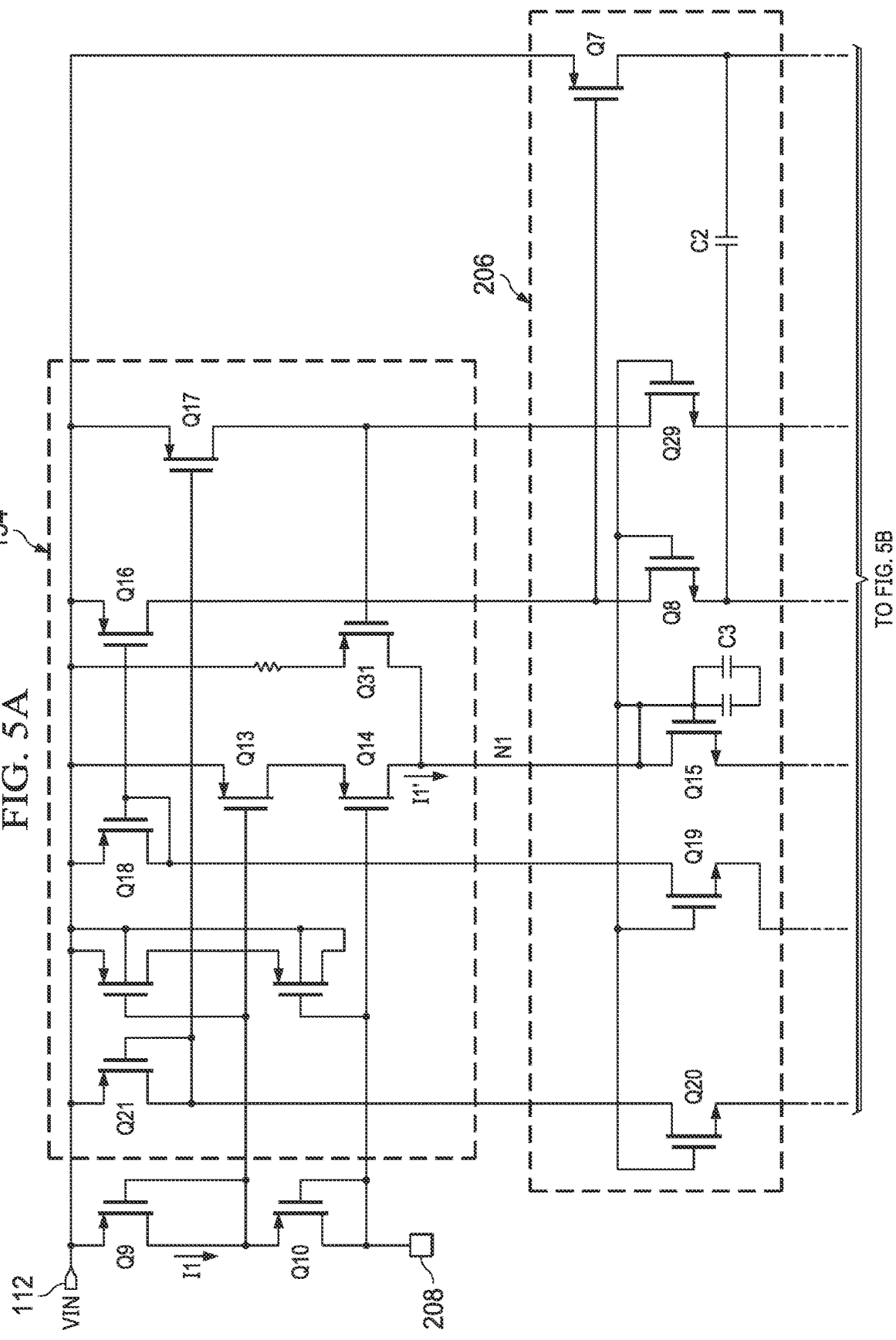
Figure 5B:
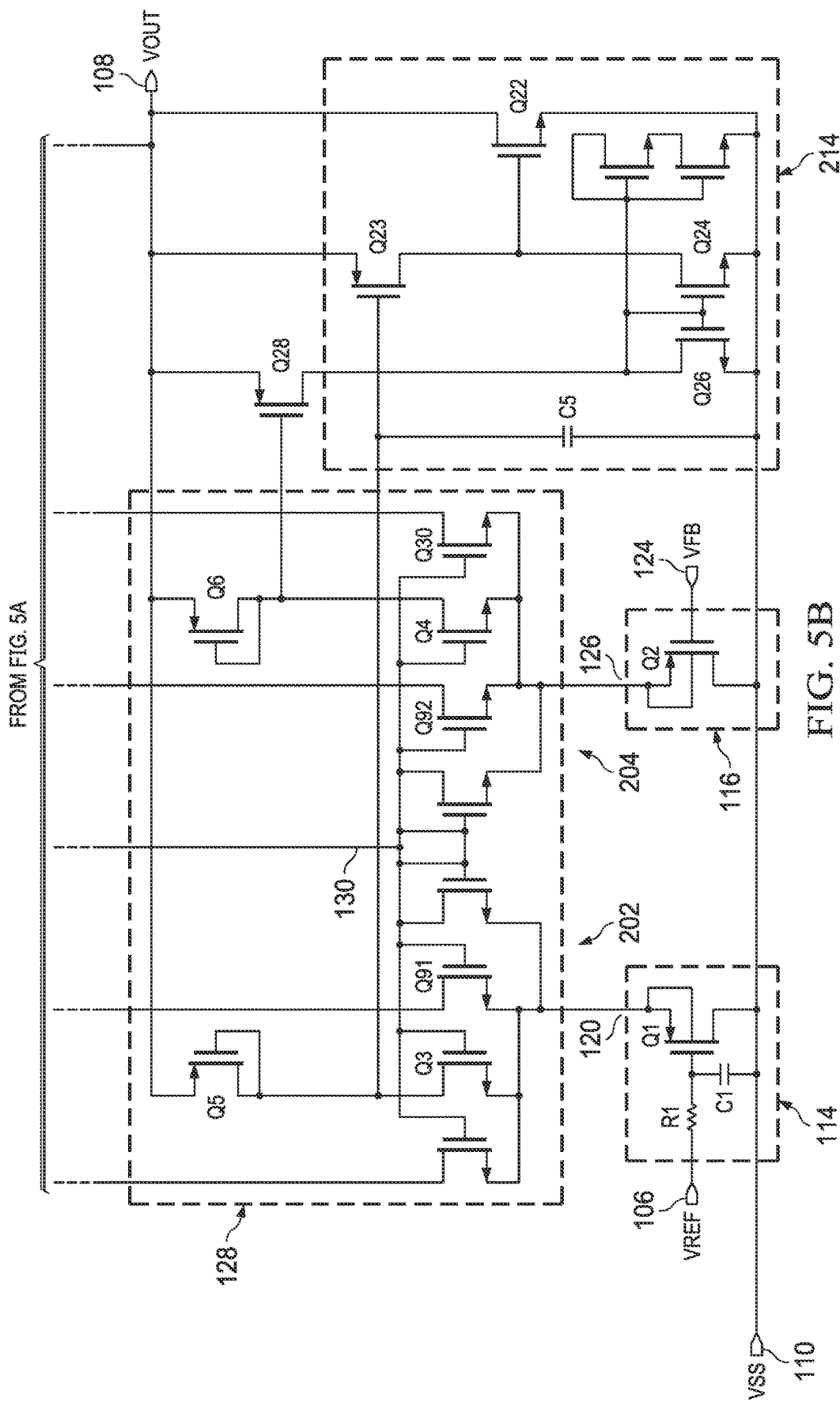

FIGS. 5A and 5B show an example relevant circuitry 500 of regulator circuit 102 configured to implement slew rate enhancement responsive to a load insertion event (e.g., when a load is coupled to or switched on the output terminal 108). At a load insertion event, the regulator circuit 102 needs to provide large load current to the output terminal 108.

As described above, Q17 is stronger than Q30 so in normal operation, Q17 is configured to keep Q31 off. Responsive to the drop in VOUT at the load insertion event, Q30 will conduct more current. When the current through Q30 exceeds the current through Q17, additional bias current flows through Q31 to improve (e.g., make faster) the pull up response so undershoot is reduced.

Figure 6:
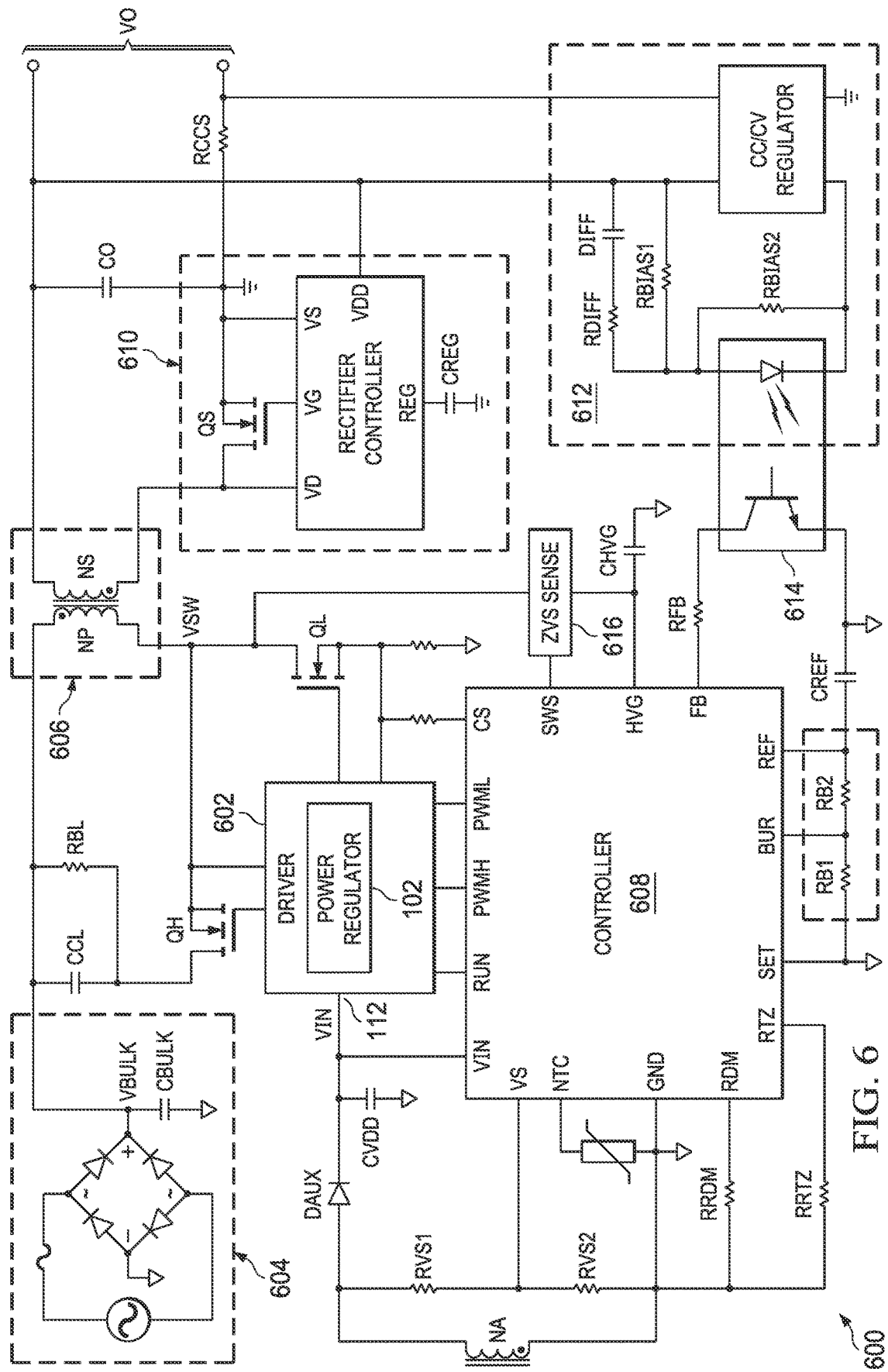
FIG. 6 depicts an example of a power supply system that includes a regulator circuit.

FIG. 6 depicts an example of a power supply system 600 implementing a driver circuit 602 that includes the power regulator 102. Accordingly, the description of FIG. 6 also refers to FIGS. 1 and 2. In the example of FIG. 6 the driver circuit 602 is coupled to gates of a high-side FET QH and a low-side FET QL. For example, QH and QL are Gallium Nitride (GaN) power FETs. Other types of transistors can be used. Thus, the driver circuit 602 can be a half-bridge driver configured to drive each of QH and QL based on regulated voltage provided by the power regulator circuit 102. In an example, the driver circuit 602 includes one instance of the power regulator circuit 102 for the QH and another instance of the power regulator circuit 102 for QL. In this way, respective regulated voltages can be produced for each FET QH and QL capable of accommodating the respective switching operations and reducing transients that might occur responsive to the drive control signals.

As an example, the system 600 includes an input power supply 604, shown as including an AC power source coupled to a full-bridge rectifier. An output of the rectifier is coupled to a primary winding NP of a transformer 606. The transformer also includes a secondary winding NS and an auxiliary winding NA. For example the source of QH is coupled to the drain of QL, which is also to a switching terminal. The switching terminal is also coupled to the primary winding. The switching terminal is configured to provide a switching voltage VSW responsive to control of QH and QL implemented by controller 608.

In the example of FIG. 6, the output of the rectifier is coupled to a bulk capacitor, shown as CBULK, and a clamp circuit, which includes a clamp capacitor CCL coupled in parallel with a bleeding resistor RBL. A bulk voltage, shown as VBULK, is provided across CBULK and provided to the primary winding NP. The driver is configured to control QH and QL to provide the switching voltage VSW at the other side of the primary winding NP responsive to input signals from a controller 608 and input voltage VIN at input terminal 112. For example, the controller 608 includes a RUN output, a PWMH output and a PWML output, which are coupled to respective inputs of the driver circuit 602. As an example, the controller can be implemented as controller circuit UCC28780 available from Texas Instruments Incorporated. Other controllers can also be used depending on application requirements.

A supply circuit is configured to supply the input voltage VIN at input terminal 112. In the example of FIG. 6, a boost capacitor CBST is coupled to the input terminal 112. An auxiliary diode DAUX is coupled between the auxiliary winding NA and the input terminal 112. A pair of sense resistors RVS1 and RVS2 are coupled between the auxiliary winding and ground. An intermediate node between RVS1 and RVS2 is coupled to a voltage sense input VS of the controller 608.

An output capacitor CO, is coupled to the secondary side of the transformer 606. For example, a secondary rectifier circuit 610 is coupled to another end of the secondary winding NS and the ground terminal to which the capacitor CO is coupled. The rectifier circuit 610 can include a depletion mode FET QS configured to charge a capacitor CVDD from the switching node voltage for supplying VIN to the driver circuit 602. A feedback circuit 612 is also coupled to the output and is configured to measure an output voltage VO. The feedback circuit 612 is coupled to a feedback (FB) input of the controller 608 through an optocoupler 614. The controller 608 is configured to regulate the output voltage VO responsive to a signal provided at the FB input, which can vary depending on the operating mode of the controller 608. In an example, the system 600 includes a zero voltage switching (ZVS) sensing circuit 616 coupled between the switching node VSW and an SWS input of the controller. The ZWS sensing circuit 616 can also be coupled to a high-voltage gate (HVG) input of the controller 608 to which an HVG bypass capacitor is also coupled.

The above power supply system 600 is an example of how a power regulator circuit, as described herein, can be implemented. Various other examples exist. By implementing one or more instances of the power regulator circuit 102 in the driver circuit 602, the driver can implement efficient driver switching in the MHz range, which is useful for GaN FETs and other high-performance components. The power regulator circuit 102 thus can enable reduced magnetics size and weight, which allows lower cost and additional applications.

In this description, the term "couple" or "couples" means either an indirect or direct connection. Thus, if a first device couples to a second device, that connection may be through a direct connection or through an indirect connection via other devices and connections. For example, if device A generates a signal to control device B to perform an action, then: (a) in a first example, device A is coupled to device B; or (b) in a second example, device A is coupled to device B through intervening component C if intervening component C does not substantially alter the functional relationship between device A and device B, so device B is controlled by device A via the control signal generated by device A.

The recitation "based on" means "based at least in part on." Therefore, if X is based on Y, X may be a function of Y and any number of other factors.

Modifications are possible in the described embodiments, and other embodiments are possible, within the scope of the claims.

What is claimed is:

1. A circuit comprising:
    a first source follower input stage having a reference voltage input and a first output;
    a second source follower input stage having a feedback voltage input and a second output, in which the second source follower input stage is configured to receive a feedback voltage at the feedback voltage input, and the feedback voltage is representative of an output voltage at an output terminal of the circuit; and
    a common gate differential gain stage having first and second differential inputs and first and second drive outputs, in which the first differential input is coupled to the first output, the second differential input is coupled to the second output, and the common gate differential gain stage is configured to control the output voltage at the output terminal by controlling at least one of the first or second drive outputs.

2. The circuit of claim 1, further comprising an output transistor having a control input, a voltage input and an output, the control input coupled to the second drive output, the voltage input coupled to an input terminal of the circuit, and the output coupled to the output terminal.

3. The circuit of claim 1, wherein
    the first source follower input stage comprises a field effect transistor having a first gate, a first source and a first drain, in which the first gate is coupled to the reference voltage input, the first source is coupled to the first output, and the first drain is coupled to a ground terminal; and
    the second source follower input stage comprises a second field effect transistor having a second gate, a second source and a second drain, in which the second gate is coupled to the feedback voltage input, the second source is coupled to the second output and the second drain is coupled to the ground terminal.

4. The circuit of claim 3, wherein the common gate differential gain stage comprises:
    first field effect transistors, each having a respective gate and a respective source, in which the respective gates are coupled to a common bias terminal and the respective sources are coupled to the first source of the first source follower input stage.

5. The circuit of claim 4, wherein the common gate differential gain stage comprises:
    second field effect transistors, each having a respective gate and a respective source, in which the respective gates are coupled to the common bias terminal and the respective sources are coupled to the second source of the second source follower input stage.

6. The circuit of claim 5, further comprising:
    bias circuitry having a voltage input and a bias output, the voltage input coupled to an input terminal of the circuit, the bias output coupled to the common bias terminal, and the bias circuitry configured to mirror a reference current to the common bias terminal.

7. The circuit of claim 6, wherein the bias circuitry is configured to inject current to the output terminal responsive to a load insertion event at the output terminal.

8. The circuit of claim 1, further comprising an output limiter circuit coupled between the output terminal and a ground terminal, the output limiter circuit configured to: reduce an overshoot responsive to removing a load at the output terminal; and sink a current from the output terminal responsive to a sustained current injection to the output terminal.

9. The circuit of claim 1, further comprising a capacitor coupled between an input terminal of the circuit and a ground terminal, the capacitor configured to provide a bootstrap voltage at the input terminal.

10. The circuit of claim 1, comprising the reference voltage input is a bandgap reference voltage input.

11. A system comprising:
    a power regulator circuit comprising:
        a first source follower input stage having a reference input and a first output;
        a second source follower input stage having a feedback input and a second output;
        a common gate differential gain stage having first and second drive inputs, a bias input and a control output, the first drive input coupled to the first output, and the second drive input coupled to the second output;
    an output power transistor having a control input, a voltage input and a regulator output, the control input coupled to the control output;
    a reference circuit having a reference output coupled to the reference input; and
    a driver circuit having a driver input coupled to the regulator output.

12. The system of claim 11, wherein the driver circuit includes a driver control input, and the system further comprises a control circuit having a respective control output coupled to the driver control input.

13. The system of claim 12, wherein
    the first source follower input stage comprises a field effect transistor having a first gate, a first source and a first drain, in which the first gate is coupled to the reference input, the first source is coupled to the first output and the first drain is coupled to a ground terminal; and
    the second source follower input stage comprises a second field effect transistor having a second gate, a second source and a second drain, in which the second gate is coupled to the feedback input, the second source is coupled to the second output and the second drain is coupled to the ground terminal.

14. The system of claim 13, wherein the common gate differential gain stage comprises:
    first field effect transistors, each having a respective gate and a respective source, in which the respective gates are coupled to a common bias terminal and the respective sources are coupled to the first source of the first source follower input stage; and
    second field effect transistors, each having a respective gate and a respective source, in which the respective gates are coupled to the common bias terminal and the respective sources are coupled to the second source of the second source follower input stage.

15. The system of claim 14, wherein the power regulator circuit comprises:
    bias circuitry having a bias input and a bias output, in which the bias input is coupled to an input terminal of the power regulator circuit, the bias output is coupled to the common bias terminal, and the bias circuitry is configured to supply a bias current to the power regulator circuit responsive to a load insertion event at an output terminal of the power regulator circuit.

16. The system of claim 11, wherein
    the reference circuit is configured to provide a reference voltage at the reference output, the reference voltage increasing from a starting voltage to a desired voltage during a startup event, in which an input voltage at an input terminal of the power regulator circuit has not reached a threshold input voltage; and the power regulator circuit is configured to provide a regulated output voltage at the regulator output responsive to the reference voltage during the startup event.

17. The system of claim 11, wherein the power regulator circuit comprises an output limiter circuit coupled between an output terminal and a ground terminal of the power regulator circuit, the output limiter circuit configured to: reduce an overshoot responsive to removing a load at the output terminal; and sink a current from the output terminal responsive to a sustained current injection to the output terminal.

18. A circuit comprising:
a first source follower input stage configured to provide a first drive signal responsive to a reference voltage;
a second source follower input stage configured to provide a second drive signal responsive to a feedback voltage, which is representative of an output voltage at an output terminal of the circuit;
a common gate differential gain stage having respective parallel gain stages, the respective parallel gain stages configured to control a current through the respective parallel gain stages responsive to the first and second drive signals, and the common gate differential gain stage configured to provide a control signal responsive to the current through the respective parallel gain stages; and
an output transistor configured to provide the output voltage at the output terminal responsive to the control signal and an input voltage.

19. The circuit of claim 18, further comprising a bias circuit configured to supply a bias current to the common gate differential gain stage responsive to the reference voltage during a startup event in which the input voltage has not reached a threshold input voltage;
wherein the common gate differential gain stage is configured to provide the control signal to make the output voltage at the output terminal increase responsive to the reference voltage during the startup event.

20. The circuit of claim 18, further comprising an output limiter circuit coupled between the output terminal and a ground terminal, the output limiter circuit configured to: reduce an overshoot responsive to removing a load at the output terminal; and sink a current from the output terminal responsive to a sustained current injection to the output terminal.

* * * * *